(12) United States Patent
Sato et al.

(10) Patent No.: US 12,038,304 B2
(45) Date of Patent: Jul. 16, 2024

(54) OPTICAL DEVICE

(71) Applicant: PIONEER CORPORATION, Tokyo (JP)

(72) Inventors: Makoto Sato, Saitama (JP); Takanori Ochiai, Saitama (JP); Takuma Yanagisawa, Saitama (JP); Masakazu Ogasawara, Saitama (JP); Ryo Izuta, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 18/134,936

(22) Filed: Apr. 14, 2023

(65) Prior Publication Data

US 2023/0251084 A1 Aug. 10, 2023

Related U.S. Application Data

(63) Continuation of application No. 16/632,272, filed as application No. PCT/JP2018/026030 on Jul. 10, 2018, now Pat. No. 11,650,051.

(30) Foreign Application Priority Data

Jul. 18, 2017 (JP) ................. 2017-138812

(51) Int. Cl.
*G01C 3/02* (2006.01)
*G01S 7/481* (2006.01)
(52) U.S. Cl.
CPC ................ *G01C 3/02* (2013.01); *G01S 7/481* (2013.01)

(58) Field of Classification Search
CPC .................................. G01C 3/02; G01S 7/481
(Continued)

(56) References Cited

U.S. PATENT DOCUMENTS

| 11,650,051 B2* | 5/2023 | Sato ........................ G01S 17/42 |
| | | 356/4.01 |
| 2005/0068517 A1 | 3/2005 | Evans et al. |

(Continued)

FOREIGN PATENT DOCUMENTS

| CN | 106125090 A | 11/2016 |
| JP | 2007-085832 A | 4/2007 |

(Continued)

OTHER PUBLICATIONS

Extended European Search Report mailed on Mar. 25, 2021 in counterpart EP Application No. 18835997.0, 7 pages.

(Continued)

*Primary Examiner* — Daniel A Hess
(74) *Attorney, Agent, or Firm* — PROCOPIO, CORY, HARGREAVES & SAVITCH LLP

(57) ABSTRACT

An optical device includes a light receiving unit that receives reflected light reflected from an object by emitted light emitted from a light emitting unit, an optical element that guides incident light including the reflected light and ambient light from a region including the object to a position on the light receiving unit according to a component included in the incident light, and a detection device that detects the reflected light based on a distribution of received light intensity on the light receiving unit. A light receiving element of the light receiving unit is arranged in a second direction intersecting a first direction in which the incident light is dispersed by the optical element.

5 Claims, 7 Drawing Sheets

(58) Field of Classification Search
USPC .......................................................... 356/4.01
See application file for complete search history.

(56) References Cited

U.S. PATENT DOCUMENTS

| | | |
|---|---|---|
| 2012/0013886 A1 | 1/2012 | Park et al. |
| 2012/0044475 A1 | 2/2012 | Yang et al. |
| 2014/0085622 A1 | 3/2014 | Wong |
| 2015/0378021 A1 | 12/2015 | Nagano et al. |
| 2017/0184454 A1 | 6/2017 | Nakai et al. |

FOREIGN PATENT DOCUMENTS

| | | |
|---|---|---|
| JP | 2011-141261 A | 7/2011 |
| JP | 2015-108539 A | 6/2015 |
| JP | 2017-015403 A | 1/2017 |

OTHER PUBLICATIONS

International Search Report and Written Opinion for related International Application No. PCT/JP2018/026030, mailed on Sep. 18, 2018; English translation of ISR provided (8 pages).

\* cited by examiner

OPTICAL DEVICE

CROSS-REFERENCE TO RELATED APPLICATIONS

This application claims the benefit of priority as continuation of U.S. patent application Ser. No. 16/632,272, filed Jan. 17, 2020, which is a National Stage entry of PCT/JP2018/026030 filed Jul. 10, 2018, which claims benefit to JP 2017-138812, filed Jul. 18, 2017, the contents of which are incorporated herein in their entirety for all purposes.

TECHNICAL FIELD

The present invention relates to an optical device that receives reflected light obtained by reflecting emitted light from an object.

BACKGROUND ART

Conventionally, an apparatus for measuring a distance to an object on the basis of a round-trip time until the reflected light returns by irradiating the object with light has been put into practical use.

In this type of device, in order to separate reflected light used for distance measurement from ambient light such as sunlight, a bandpass filter that transmits only light having the wavelength of the irradiated light is used to improve S/N ratio (for example, refer to Patent Literature 1).

In addition, in this type of device, there is a problem that the wavelength of a light emitting element that emits light for distance measurement varies due to individual variation, temperature variation, and the like.

PRIOR ART DOCUMENT

Patent Literature

Patent Literature 1: JP 2007-85832 A

SUMMARY OF INVENTION

Technical Problem

In the invention described in Patent Literature 1, in order to cope with the temperature variation of the light emitting element, the center wavelength of the light transmitted through the filter is adjusted so as to follow the wavelength of the light emitted from the light projecting unit estimated from the temperature of the semiconductor laser element that is a light emitting element.

However, since the bandpass filter is used in the invention described in Patent Literature 1, considering the variation in the wavelength of light due to the temperature variation of the light emitting element and the difference in the wavelength of the emitted light due to individual variations, it is necessary to have a certain range of the wavelength to pass, and there is a limit to improving the accuracy of separating ambient light.

An example of the problem to be solved by the present invention is to improve the separation accuracy of ambient light other than the reflected light of the emitted light as described above in an apparatus that measures the distance from an object by irradiating light.

Solution to Problem

For solving the problem above, according to a first aspect of the present invention, there is provided an optical device including:

a light receiving unit that receives reflected light reflected from an object by emitted light emitted from a light emitting unit;
an optical element that guides incident light including the reflected light and ambient light from a region including the object to a position on the light receiving unit according to a component included in the incident light; and
a detection device that detects the reflected light based on a distribution of received light intensity on the light receiving unit.

DESCRIPTION OF EMBODIMENTS

Figure 1:
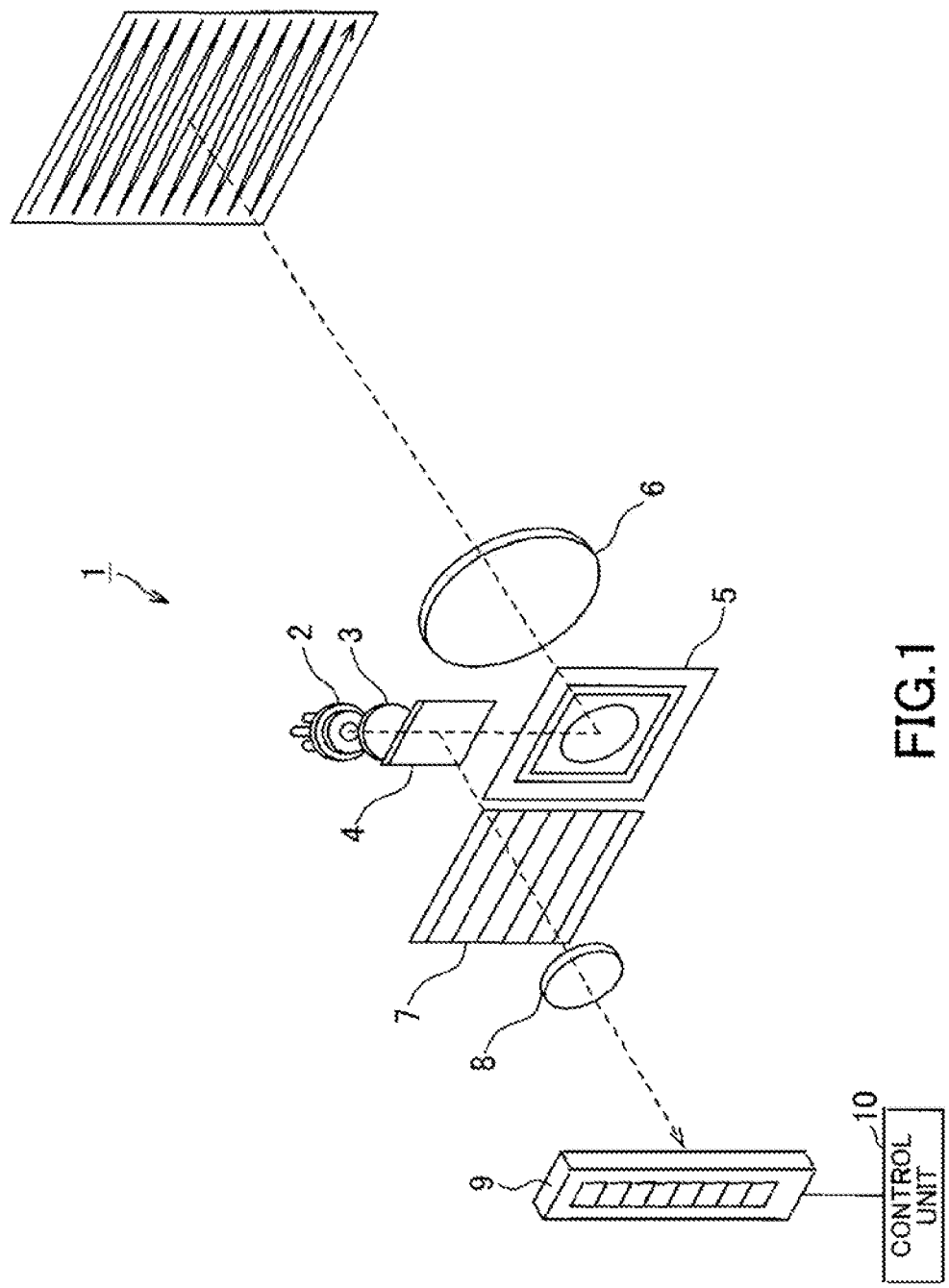
FIG. 1 is a schematic configuration diagram of an optical device according to a first embodiment of the present invention.

Hereinafter, an optical device according to an embodiment of the present invention will be described. The present invention relates to an apparatus for measuring a distance to an object by irradiating the object with light, measuring flight time of the light reflected by the object and returning to the light receiving unit. The optical device according to one embodiment of the present invention includes: a light receiving unit that receives reflected light reflected from an object by emitted light emitted from a light emitting unit; an optical element that guides incident light including the reflected light and ambient light from a region including the object to a position on the light receiving unit according to a component included in the incident light; and a detection device that detects the reflected light based on a distribution of received light intensity on the light receiving unit. The emitted light emitted from the light emitting unit is light having a single wavelength or a very narrow wavelength range such as laser light, and the ambient light is light having a wide wavelength range such as sunlight. Therefore, the reflected light is received by only one of the plurality of light receiving elements, and the ambient light is received by all the light receiving elements. Therefore, it is possible to easily identify which light receiving element has received the reflected light from the received light intensity, and it is possible to effectively remove unnecessary environmental components by discarding the light receiving signal of the light receiving elements other than this light receiving element. In addition, in this way, even if there is a difference in the wavelength of the emitted light due to a variation in the wavelength of the light due to temperature fluctuations of the emitting unit or individual variations, the optical element can guide the reflected light to any one of the plurality of light receiving elements according to the wavelength. Therefore, the reflected light can be reliably received.

Further, the optical element may have a configuration for dispersing light according to a wavelength of the light, and in the light receiving unit, a plurality of light receiving elements may be arranged along a direction in which the incident light is dispersed by the optical element. In this way, a so-called line sensor in which a plurality of light receiving elements are formed in a line shape as the light receiving unit can be used.

Further, the receiving element may be also arranged in a second direction intersecting a first direction in which the incident light is dispersed by the optical element, and the optical device may further include an extension device for extending the emitted light in a predetermined direction so that an extension direction of the reflected light is the second direction in the light receiving unit. In this way, when the emitted light is not a dot shape but a linear light with a uniform intensity distribution, the reflected light of the linear emitted light can be detected at a time.

Further, each of the plurality of light receiving elements may output a signal corresponding to intensity of received light, and the detection device may identify a signal output from the light receiving element having maximum received light intensity as a signal due to reception of the reflected light. In this way, by identifying the light receiving element having the maximum received light intensity, it is possible to easily detect the reflected light of the emitted light emitted from the emitting unit.

Further, a distance measuring device having the optical device according to any one of first to fourth aspect of the present invention may measures a distance to the object based on a time required from emission of the emitted light to reception of the emitted light by the light receiving unit. In this way, in the distance measuring device, the reflected light can be reliably received, and the distance measurement accuracy can be improved.

First Embodiment

An optical device according to a first embodiment of the present invention will be described with reference to FIGS. 1 to 9. As shown in FIG. 1, the optical device 1 according to the present embodiment includes: a light source 2; a collimating lens 3; a beam splitter 4; a MEMS mirror 5; a light projecting/receiving lens 6; a diffraction grating 7; a light collecting lens 8; a line sensor 9; and a control unit 10.

The light source 2 as the light emitting unit is constituted by, for example, a laser diode. The light source 2 emits pulsed laser light having a predetermined wavelength.

The collimating lens 3 turns the laser light emitted from the light source 2 into a parallel light beam. The beam splitter 4 outputs the laser light converted into parallel light by the collimator lens 3 to the MEMS mirror 5 and reflects incident light, which will be described later, reflected by the MEMS mirror 5 toward the diffraction grating 7.

The MEMS mirror 5 scans the laser beam emitted from the beam splitter 4 in the horizontal direction and the vertical direction toward the region where the object 100 exists.

Further, the MEMS mirror 5 reflects incident light, which is incident on the light projecting/receiving lens 6, from the light reflected by the object 100 to the beam splitter 4. The MEMS mirror 5 is a mirror constituted by MEMS (Micro Electro Mechanical Systems), and is driven by an actuator (not shown) formed integrally with the mirror. Further, the MEMS mirror 5 may be other beam deflection means such as a galvanometer mirror or a polygon mirror.

The light projecting/receiving lens 6 irradiates (projects) the laser beam reflected by the MEMS mirror 5 onto a region where the object 100 exists. Further, reflected light that is laser light reflected by the object 100 and ambient light such as sunlight (including sunlight reflected by the object 100) is incident (received) on the light projecting/receiving lens 6 as incident light.

The diffraction grating 7 as an optical element diffracts incident light incident from the beam splitter 4 to the line sensor 9 at a diffraction angle corresponding to the wavelength component of the incident light. Incidentally, in the present embodiment, a reflection type diffraction grating is described, but a transmission type diffraction grating may be used. That is, it has a configuration for splitting light according to the wavelength of light.

The condenser lens 8 is provided between the diffraction grating 7 and the line sensor 9, and condenses incident light diffracted by the diffraction grating 7 onto the line sensor 9.

The line sensor 9 as a light receiving unit is a light receiving sensor in which a plurality of light receiving elements are arranged in a line along a direction in which light incident on the diffraction grating 7 is diffracted (a direction in which light is dispersed). Each of the plurality of light receiving elements receives light corresponding to the wavelength component among the incident light diffracted by the diffraction grating 7. Each light receiving element of the line sensor 9 outputs a signal corresponding to the intensity (light receiving intensity) of the received light to the control unit 10. Moreover, the line sensor 9 can be comprised by the avalanche photodiode (APD) as the light receiving element, for example.

The control unit 10 as a detection device detects the reflected light of the laser light emitted from the light source 2 based on a signal indicating the received light intensity of each light receiving element of the line sensor 9.

Figure 2:
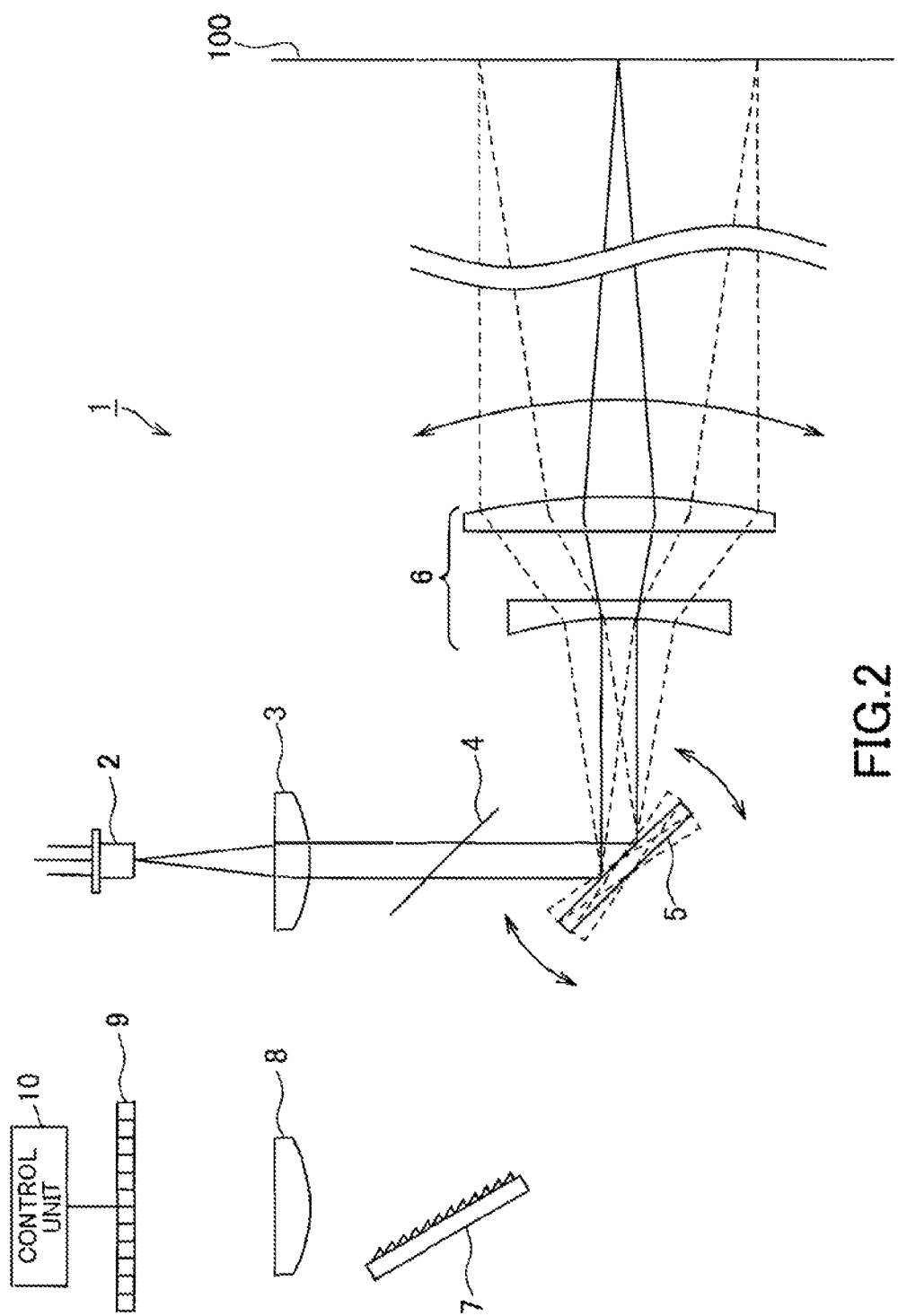
FIG. 2 is an explanatory diagram showing an operation of a light projecting system of the optical device shown in FIG. 1.

Next, the operation of the optical device 1 having the above-described configuration will be described with reference to FIGS. 2 and 3. FIG. 2 is an explanatory diagram of the operation during emission (light projection system).

First, the laser light emitted from the light source 2 is collimated by the collimator lens 3 and then enters the MEMS mirror 5 via the beam splitter 4. Then, the laser beam reflected by the MEMS mirror 5 is irradiated in a pulse shape toward the outside of the optical device 1 by the light projecting/receiving lens 6. At this time, by changing the angle of the MEMS mirror 5 at each irradiation timing, the position of the beam spot irradiated toward the region where the object 100 exists can be temporally changed, and a horizontal scan and a vertical scan are performed.

Figure 3:
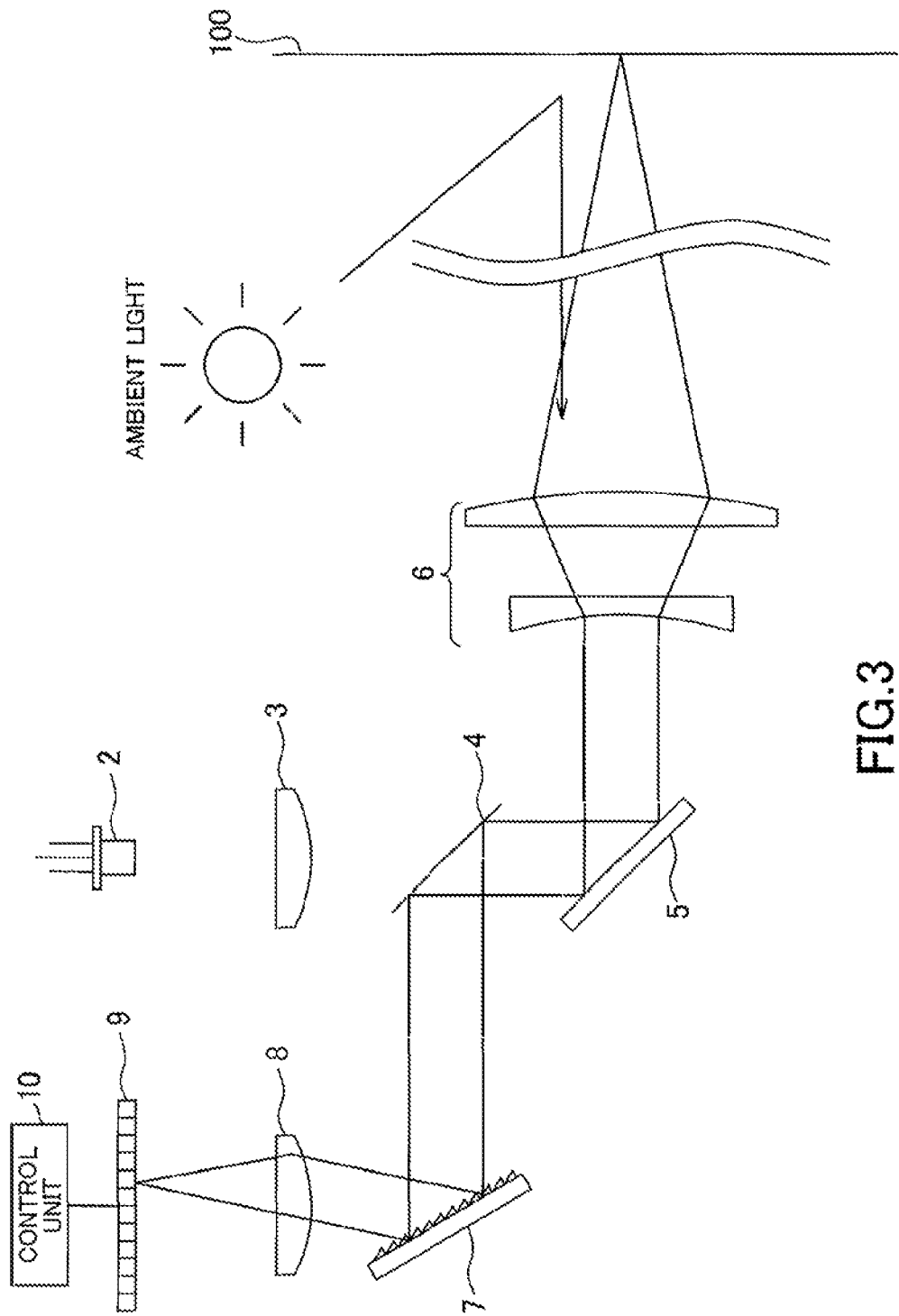
FIG. 3 is an explanatory view showing an operation of a light receiving system of the optical device shown in FIG. 1.

FIG. 3 shows the operation at the time of incidence (light receiving system). The laser light reflected (scattered) by the object 100 is received by the light projecting/receiving lens 6, followed by an optical path opposite to that at the time of light projection, reflected by the MEMS mirror 5, reflected by the beam splitter 4, and enters the diffraction grating 7. The diffraction angle of the diffraction grating 7 is determined according to the groove pitch and the wavelength of incident light. In the present embodiment, because laser light is used and the wavelength of light incident on the diffraction grating 7 is single, the laser light is diffracted in a predetermined direction determined by the wavelength of the laser light, and then condensed by a condensing lens 8 onto a predetermined light receiving element on the line sensor 9.

At this time, the light incident on the light projecting/receiving lens 6 is not only the reflected light of the laser light emitted from the light source 2. Any light that illuminates the object 100 such as sunlight or light from a streetlight, or light reflected by the object 100 enters the light projecting/receiving lens 6 and enters the diffraction grating 7 via the MEMS mirror 5. Ambient light such as sunlight is light including various wavelengths, is diffracted in various directions by the diffraction grating 7, and is incident on a plurality of light receiving elements on the line sensor 9 according to the included wavelength range. That is, the line sensor 9 (light receiving unit) receives both reflected light reflected by the object 100 from the light emitted from the light source 2 (light emitting unit) and ambient light. However, the ambient light that has entered the light projecting/receiving lens 6 is unnecessary light for measuring the distance to the object 100 and is preferably excluded. The control unit 10 uses only the information of the light receiving element on which the reflected light of the laser light is incident among the plurality of light receiving elements of the line sensor 9 and does not use the information of the other light receiving elements, thereby most of the ambient light can be removed from the light incident on the line sensor 9 (details will be described later).

The operation of the diffraction grating 7 will be described in detail with reference to FIGS. 4 and 5. The diffraction angle $\theta_2$ when the monochromatic light having the wavelength $\lambda_0$ is incident on the diffraction grating 7 with the groove interval p from the direction of the angle $\theta_1$ is expressed by the following equation (1).

$$\theta_2 = \mathrm{Sin}^{-1}\left(\sin\theta_1 + \frac{\lambda_0}{p}\right) \quad (1)$$

Figure 4:
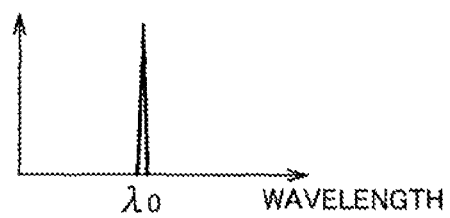
FIG. 4 is an explanatory diagram showing an action of a diffraction grating when a laser beam is incident.
Figure 4:
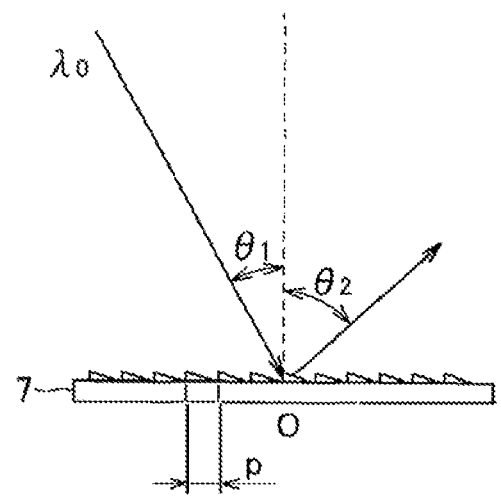
Figure 5:
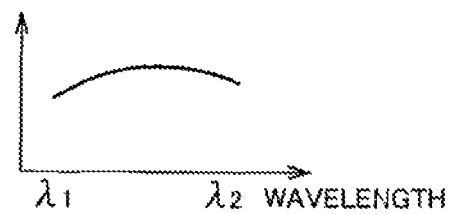
FIG. 5 is an explanatory diagram showing an action of the diffraction grating when ambient light is incident.
Figure 5:
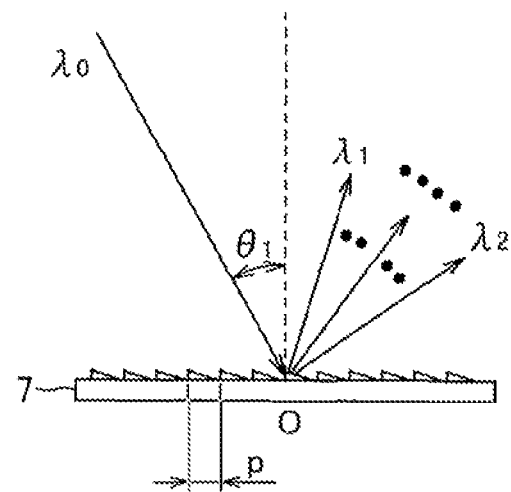
Figure 6:
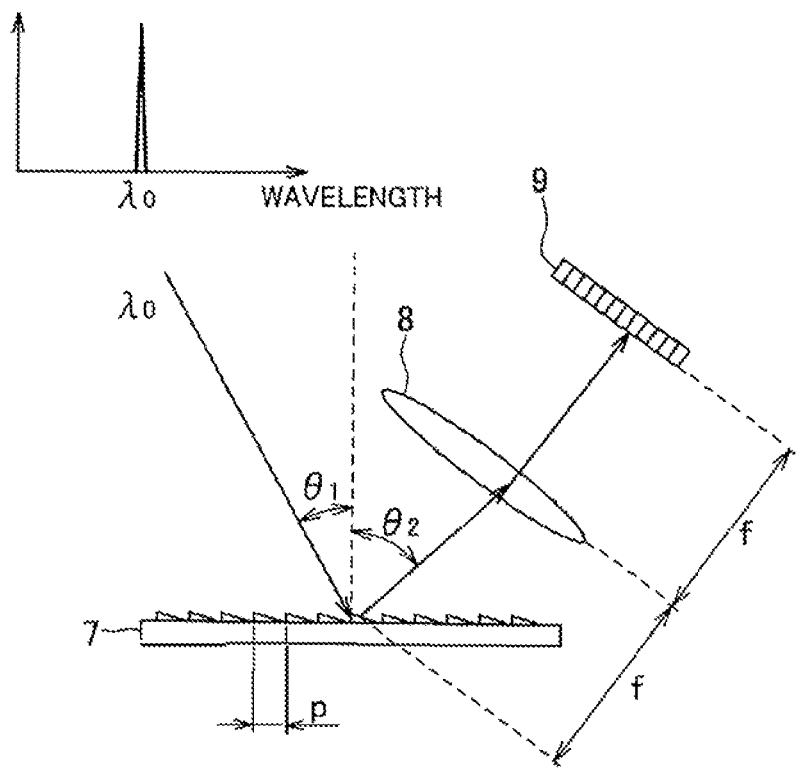
FIG. 6 is an explanatory diagram showing an action of a condenser lens when laser light is incident.

As shown in FIG. 4, the diffraction grating 7 diffracts only in a specific direction $\theta_2$ in a situation where monochromatic light (laser light) is incident. Incidentally, in the following description, diffracted light means +1st order diffracted light unless otherwise specified. Further, in this embodiment, a blazed diffraction grating having a sawtooth groove shape is used as the diffraction grating. Since the diffraction efficiency of +1st order light can theoretically be 100% by the blazed diffraction grating, it is desirable to use a blazed diffraction grating. On the other hand, as shown in FIG. 5, when light having a wavelength range of $\lambda_1$ to $\lambda_2$ is incident on the same diffraction grating 7, it is diffracted in different directions for each wavelength component. That is, the reflected light of the laser beam and the ambient light are incident on the diffraction grating 7 (optical element) as incident light. The incident light includes light of various wavelengths, and the light is guided to any one of the plurality of light receiving elements according to the wavelength. That is, the diffraction grating 7 guides to a position on the light receiving unit corresponding to the component included in the incident light.

Next, the operation of the condenser lens 8 will be described. Since even a laser beam is actually a beam having a predetermined width, in the present embodiment, a condenser lens 8 is provided to collect the diffracted light diffracted by the diffraction grating 7 on the line sensor 9.

Figure 7:
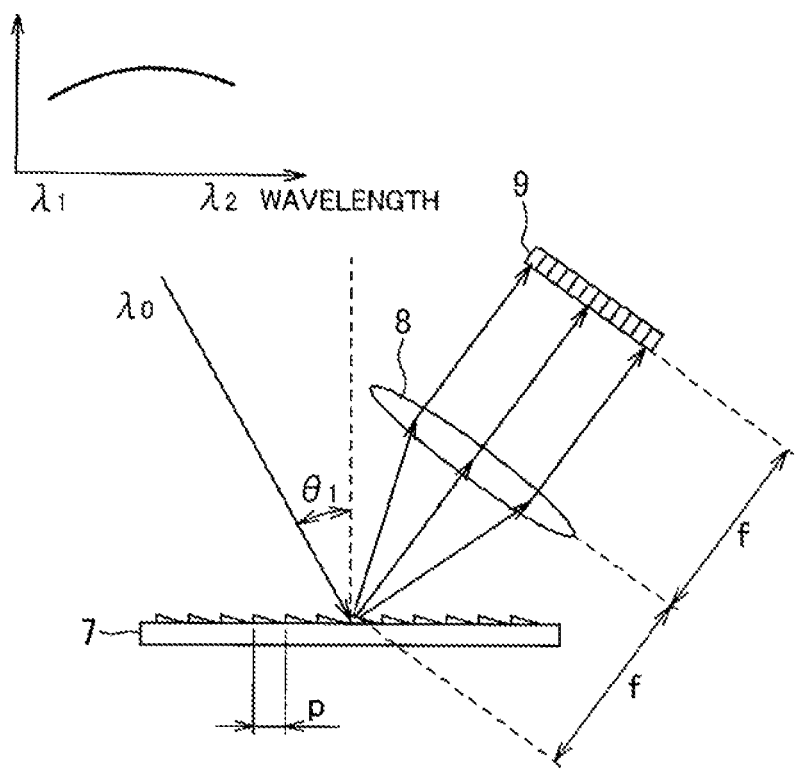
FIG. 7 is an explanatory diagram showing an action of the condenser lens when ambient light is incident.

When the focal length of the condenser lens 8 is f, the distance from the diffraction grating 7 to the condenser lens 8 and the distance from the condenser lens 8 to the line sensor 9 are both arranged at the focal length f (see FIG. 6 and FIG. 7), thereby the diffracted light diffracted in the direction in which the light receiving elements are arranged at a predetermined diffraction angle is condensed on one of the light receiving elements on the line sensor 9. When the incident light is monochromatic light (laser light), it is incident only on a specific light receiving element on the line sensor 9 (FIG. 6), and when the incident light has a certain wavelength range, it is incident on a plurality of light receiving elements (FIG. 7). That is, among the diffracted light, the reflected light of the laser light emitted from the light source 2 is incident only on a specific light receiving element on the line sensor 9, and the ambient light is incident on a plurality of light receiving elements corresponding to the included wavelength components.

The focal length f may be set so as to have an appropriate wavelength resolution according to the size of the line sensor 9 to be used and the number of light receiving elements.

Figure 8:
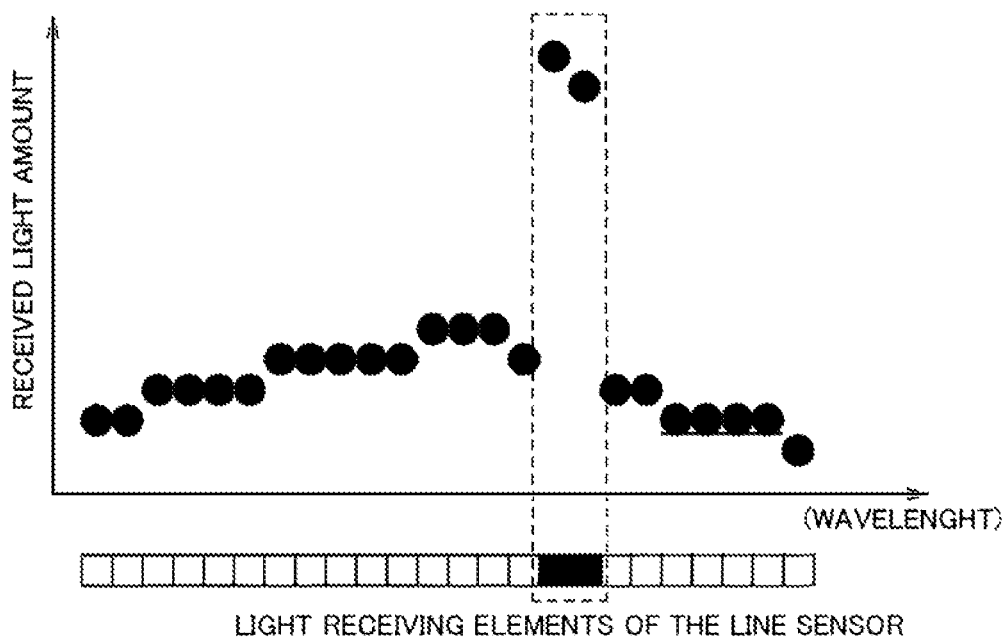
FIG. 8 is an explanatory diagram of an operation of a control unit shown in FIG. 1.

Next, a method in which the control unit 10 detects laser light (reflected light) based on the result received by the line sensor 9 will be described with reference to FIGS. 8 and 9. As described above, the line sensor 9 is a light receiving sensor in which a plurality of light receiving elements are arranged in a line along the direction in which light incident on the diffraction grating 7 is diffracted. Therefore, when the laser light (reflected light) and the ambient light are simultaneously incident on the line sensor 9 via the diffraction grating 7, the received light amount of each light receiving element on the line sensor 9 is as shown in FIG. 8. The horizontal axis in FIG. 8 is the wavelength, that is, the position of the light receiving element of the line sensor, and the vertical axis is the received light amount. That is, FIG. 8 shows a distribution of received light intensity on the light receiving unit. Since the laser light is irradiated with an appropriate intensity, in FIG. 8, it can be said that the light receiving element exhibiting a particularly high received light amount is a light receiving element in which not only ambient light but also laser light is incident. Therefore, by identifying the received light element showing such a high received light amount, it is possible to identify and detect the signal received by the reflected light of the laser light from the light received by the line sensor 9.

Figure 9:
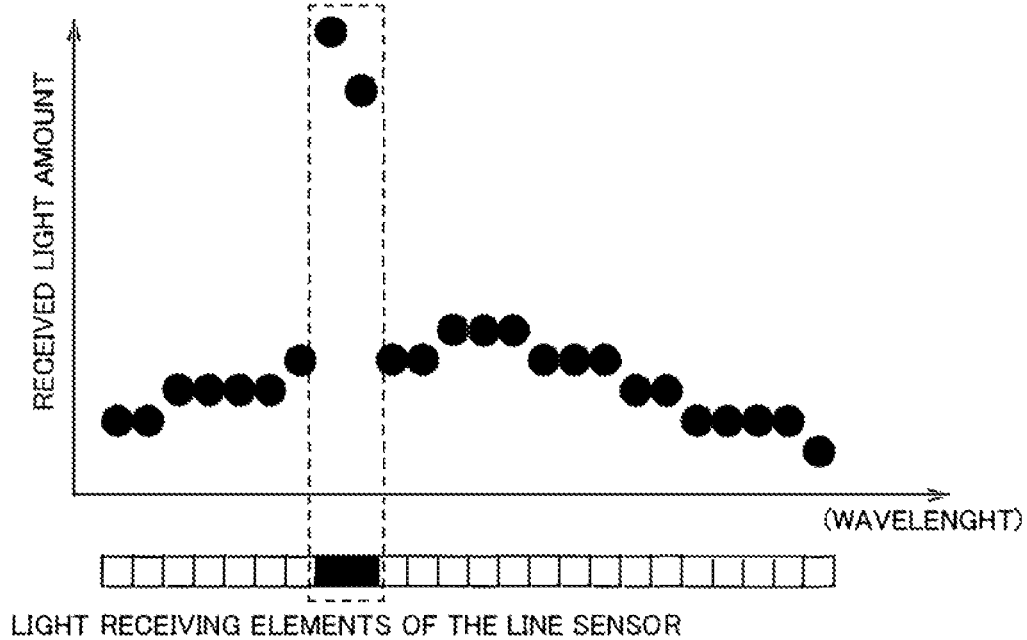
FIG. 9 is an explanatory diagram of the operation of the control unit shown in FIG. 1.

Further, even when the wavelength of the laser beam varies due to the temperature change of the light source 2 or when the wavelength of the laser beam is different from that assumed due to individual variations, as shown in FIG. 9, laser light can be easily detected by detecting a light receiving element that exhibits a high received light amount. That is, the line sensor 9 includes a number of light receiving elements that can cover the range of change in the diffraction angle of the laser light diffracted by the diffraction grating 7 due to the change in the wavelength of the laser light due to the temperature change of the light source 2 and individual variations.

According to the present embodiment, the optical device 1 includes: the line sensor 9 having a plurality of light receiving elements for receiving reflected light reflected by the object 100 with laser light emitted from the light source 2 and ambient light; and the diffraction grating 7 that leads to one of a plurality of light receiving elements according to the wavelength of the incident light when the reflected light and the ambient light are incident as incident light. The line sensor 9 can receive light in a predetermined range including the wavelength of the laser light emitted from the light source 2. In this way, even when the wavelength of the laser beam varies due to the temperature variation of the light source 2 or when the emitted light is different from that assumed due to individual variations, the reflected light can be guided to any one of a plurality of light receiving elements corresponding to the wavelength by the diffraction grating 7. Therefore, the reflected light can be reliably received.

Further, the condenser lens 8 is provided between the diffraction grating 7 and the line sensor 9. In this way, it becomes possible to adjust the focal distance of incident light so that it may become suitable wavelength resolution according to characteristics, such as a size of the light receiving element of the line sensor 9.

Further, each of the plurality of light receiving elements of the line sensor 9 outputs a signal corresponding to the received light intensity of the received light, and the control unit 10 identifies the light receiving element that has output a signal indicating that the received light intensity is maximum. In this way, it is possible to easily detect the emitted light emitted from the light source 2 by specifying the light receiving element having the maximum light receiving intensity.

Moreover, this optical device can use the distance to a target object for a measurement. That is, by measuring the time from when the light source emits laser light until it is received by the light receiving element as reflected light reflected by the object 100 with the CPU or the like of a distance measuring device equipped with this optical device, the distance from the optical device to the object can be measured.

Second Embodiment

Figure 10:
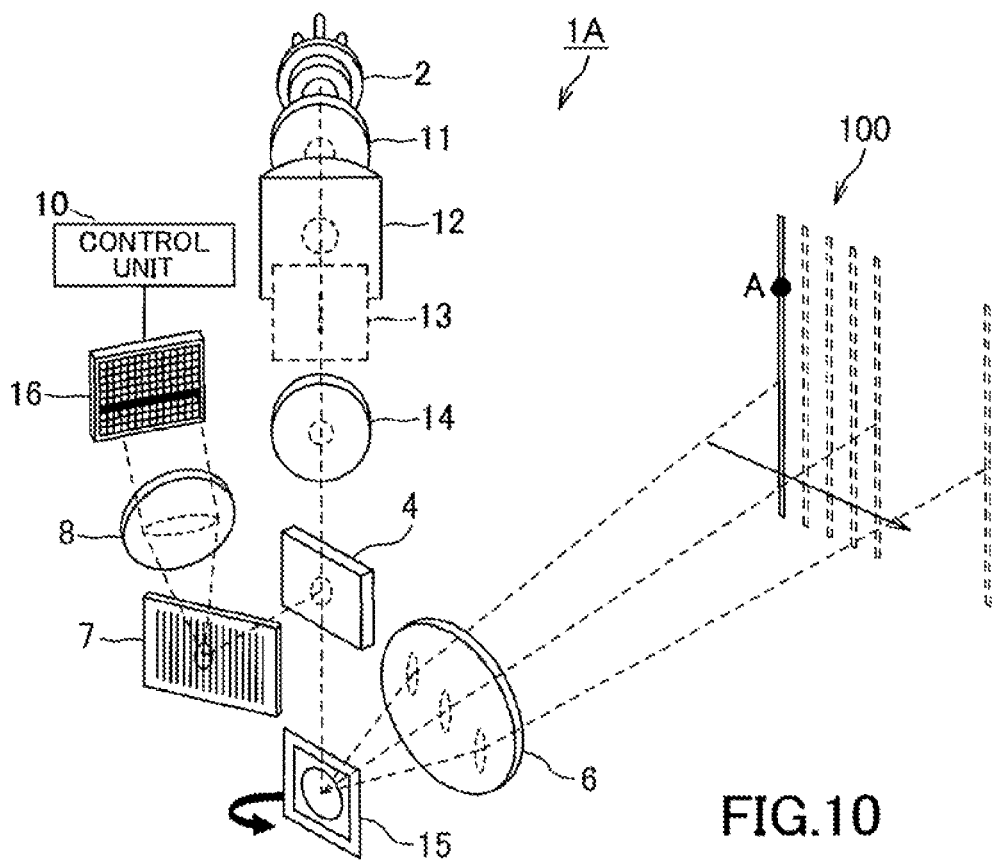
FIG. 10 is a schematic configuration diagram of an optical device according to a second embodiment of the present invention.

Next, an optical device according to a second embodiment of the present invention will be described with reference to FIGS. 10 and 11. Incidentally, the same components as those in the first embodiment described above are denoted by the same reference signs and description thereof is omitted.

Figure 11:
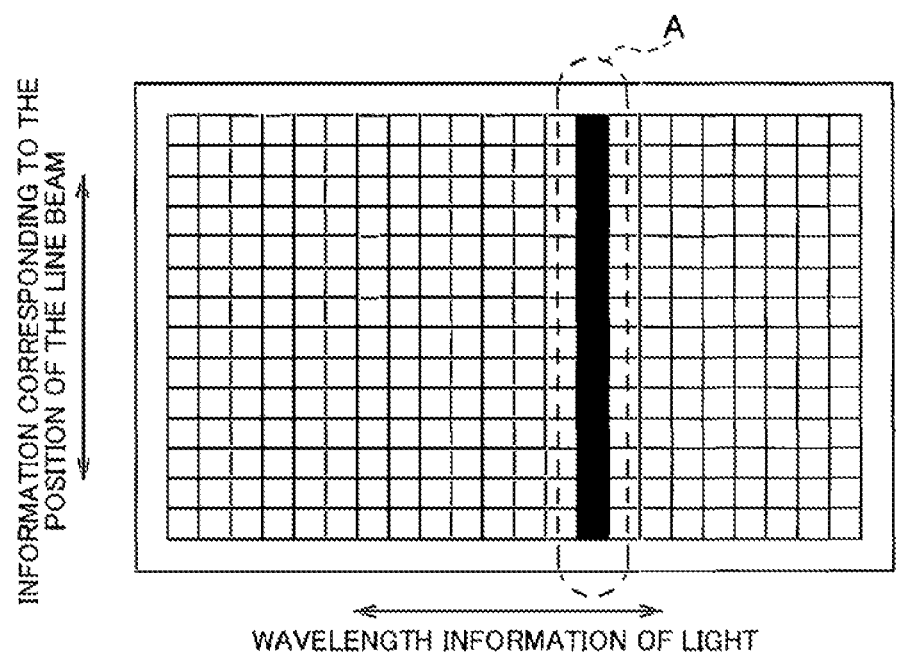
FIG. 11 is a schematic configuration diagram of a light receiving sensor shown in FIG. 10.

As shown in FIG. 11, an optical device 1A according to the present embodiment includes: a light source 2; a lens 11; a cylindrical lens 12; a lens 14; a beam splitter 4; a MEMS mirror 15; a light projecting/receiving lens 6; a diffraction grating 7; a condenser lens 8; a light receiving sensor 16; and a control unit 10.

The light source 2, the beam splitter 4, the light projecting/receiving lens 6, the diffraction grating 7, and the condenser lens 8 are the same as those in the first embodiment. Incidentally, the diffraction grating 7 is arranged so as to diffract incident light in a direction orthogonal to an extension direction of a line beam described later.

The lens 11 and the cylindrical lens 12 as an extension device convert the laser light emitted from the light source 2 into a linear light having a uniform intensity distribution from a dot shape (that is, a line beam whose light beam cross section is a band-shaped light). That is, the lens 11 and the cylindrical lens 12 extend emitted light in a predetermined direction. Reference sign 13 denotes an intermediate image (line image) of the above-described line beam. The lens 14 is a lens for imaging the line beam onto the beam splitter 4.

In this embodiment, the MEMS mirror 15 is a uniaxial mirror that scans only in a direction orthogonal to the extending direction of the line beam emitted from the cylindrical lens 12.

In this embodiment, the light receiving sensor 16 is a two-dimensional light receiving unit in which light receiving elements are arranged in a matrix (two-dimensional shape). That is, in the light receiving sensor 16, the light receiving elements are provided not only in the direction (first direction) in which the diffraction grating 7 (optical element) is dispersed according to the wavelength of incident light, but also in the direction (second direction) perpendicular to that direction.

FIG. 11 shows a schematic configuration of the light receiving sensor 16. As shown in FIG. 11, the light receiving sensor 16 has light receiving elements 16a arranged in a matrix (two-dimensional). In the example of FIG. 11, elements are arranged in the vertical direction corresponding to the extending direction of the line beam, and elements are arranged in the horizontal direction corresponding to light diffracted by the diffraction grating.

The optical device 1A of the present embodiment projects a line beam toward an area where the object 100 exists, and scans the position of the beam spot in time by scanning in one axis direction (horizontal direction in FIG. 11) with the line beam. Thus, the position of the beam spot can be changed with time. Then, the reflected light of the line beam and the ambient light are received by the light receiving sensor 16 via the diffraction grating 7 that diffracts the light in a direction orthogonal to the extending direction of the line beam. In the light receiving sensor 16, light receiving elements are two-dimensionally arranged so that light according to the wavelength can be received. As a result, the wavelength information contained in the reflected light of the line beam and the ambient light is simultaneously obtained from each light receiving element.

In the light projecting system, a line-shaped intermediate image 13 is generated by the lens 11 and the cylindrical lens 12, and the line beam is irradiated to the region where the object 100 exists by the lens 14 and the light projecting/receiving lens 6.

In the light receiving system, the reflected light of the line beam irradiated toward the region where the object 100 exists is diffracted by the diffraction grating 7 in a predetermined direction determined by the wavelength of the line beam, and then the condenser lens 8 is configured to condense on any of the light receiving elements on the line sensor 9. The diffraction grating 7 diffracts incident light in a direction perpendicular to the extension direction of the line beam according to the wavelength. Since the laser light emitted from the light source 2 is light having a single wavelength, it is diffracted only in a specific direction by the diffraction grating 7 and condensed on a specific column on the light receiving sensor 16. On the other hand, since the ambient light received simultaneously with the reflected light of the line beam includes various wavelength components, the light diffracted by the diffraction grating 7 according to the wavelength component is received by each of the light receiving elements constituting the light receiving sensor 16 according to the wavelength of the light. The controller 10 uses only the information of the light receiving element on which the reflected light of the line beam is incident, from the light received by the light receiving sensor 16 by specifying the row of light receiving elements having high light receiving intensity, and ambient light components having different wavelengths from the laser light can be removed.

According to the present embodiment, the light receiving sensor 16 is also provided with the light receiving elements 16a in the direction orthogonal to the direction in which the line beam is diffracted by the diffraction grating 7 according to the wavelength of the incident light. This makes it possible to detect the reflected light of the line beam when the emitted light is not a point but a line beam.

Incidentally, this invention is not limited to the above embodiments. That is, those skilled in the art can implement various modifications in accordance with conventionally known knowledge without departing from the scope of the present invention. Of course, such modifications are included in the scope of the present invention as long as the configuration of the optical device of the present invention is provided.

REFERENCE SIGNS LIST 1, 1A Optical device
2 Light source (light emitting unit)
7 Diffraction grating (optical element)
8 Condenser lens
9 Line sensor (light receiving unit)
10 Control unit (detection device)
11 Lens (extension device)
12 Cylindrical lens (extension device)
16 Light receiving sensor (light receiving unit)
100 Object

The invention claimed is:
1. An optical device comprising:
a light receiving unit that receives reflected light reflected from an object by emitted light emitted from a light emitting unit;
an optical element that guides incident light including the reflected light and ambient light from a region including the object to a position on the light receiving unit according to a component included in the incident light; and
a detection device that detects the reflected light based on a distribution of received light intensity on the light receiving unit,
wherein a plurality of light receiving elements of the light receiving unit is arranged in a second direction intersecting a first direction in which the incident light is dispersed by the optical element, and
wherein the first direction and the second direction are directions within a plane in which the plurality of the light receiving elements of the light receiving unit is arranged.

2. The optical device as claimed in claim 1, wherein the optical element has a configuration for dispersing light according to a wavelength of the light, and
wherein, in the light receiving unit, the plurality of light receiving elements is arranged along the first direction in which the incident light is dispersed by the optical element.

3. The optical device as claimed in claim 1, wherein the optical device further comprises an extension device for extending the emitted light in a predetermined direction so that an extension direction of the reflected light is the second direction in the light receiving unit.

4. The optical device as claimed in claim 1, wherein each of the plurality of light receiving elements outputs a signal corresponding to intensity of received light, and
wherein the detection device identifies a signal output from the light receiving elements having maximum received light intensity as a signal due to reception of the reflected light.

5. A distance measuring device having the optical device of claim 1, wherein the distance measuring device measures a distance to the object based on a time required from emission of the emitted light to reception of the emitted light by the light receiving unit.

* * * * *